Sept. 28, 1948.  H. B. MILLER  2,450,152
FRUIT PICKER'S CRANE
Filed Jan. 5, 1946  3 Sheets-Sheet 1
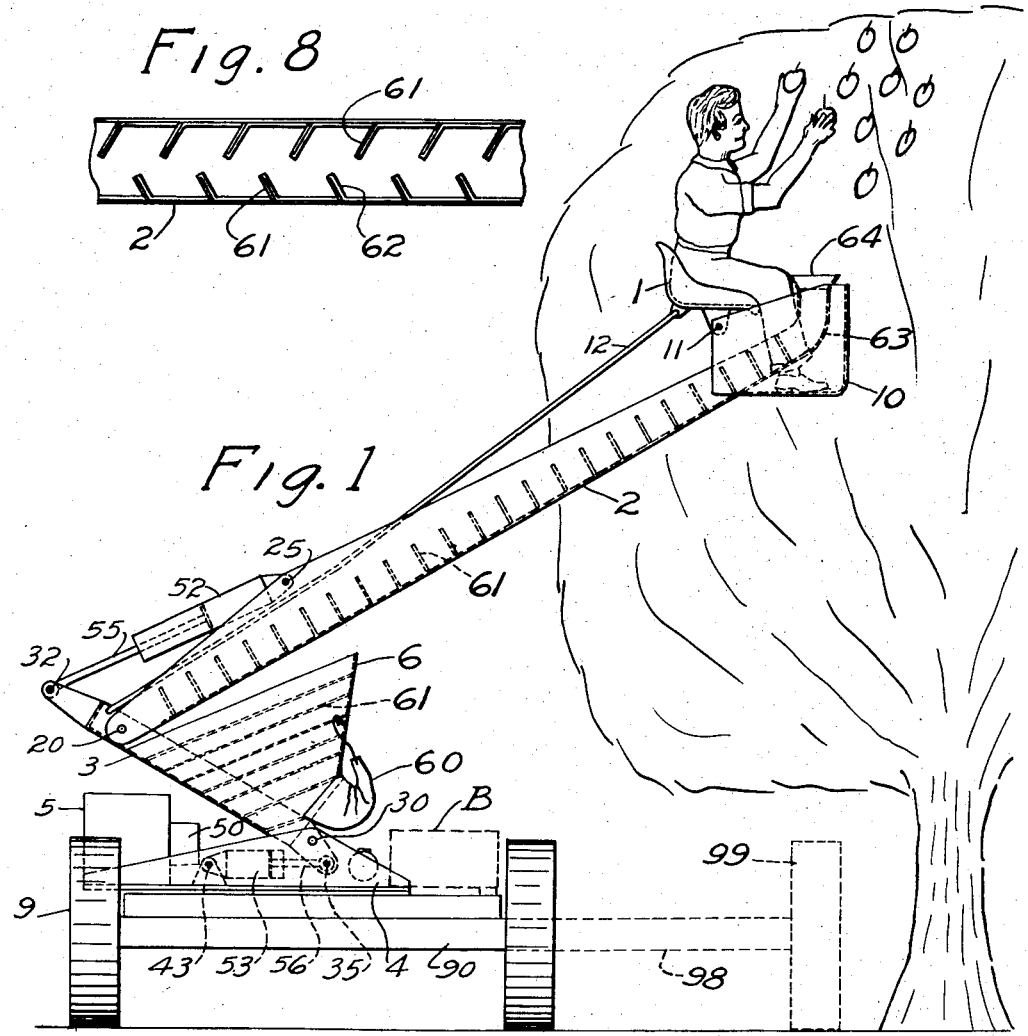
INVENTOR.
HOWARD B. MILLER.
BY
Reynolds+Beach
ATTORNEYS

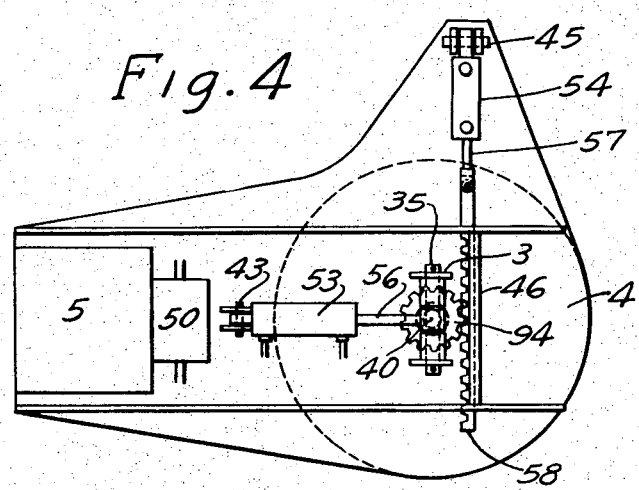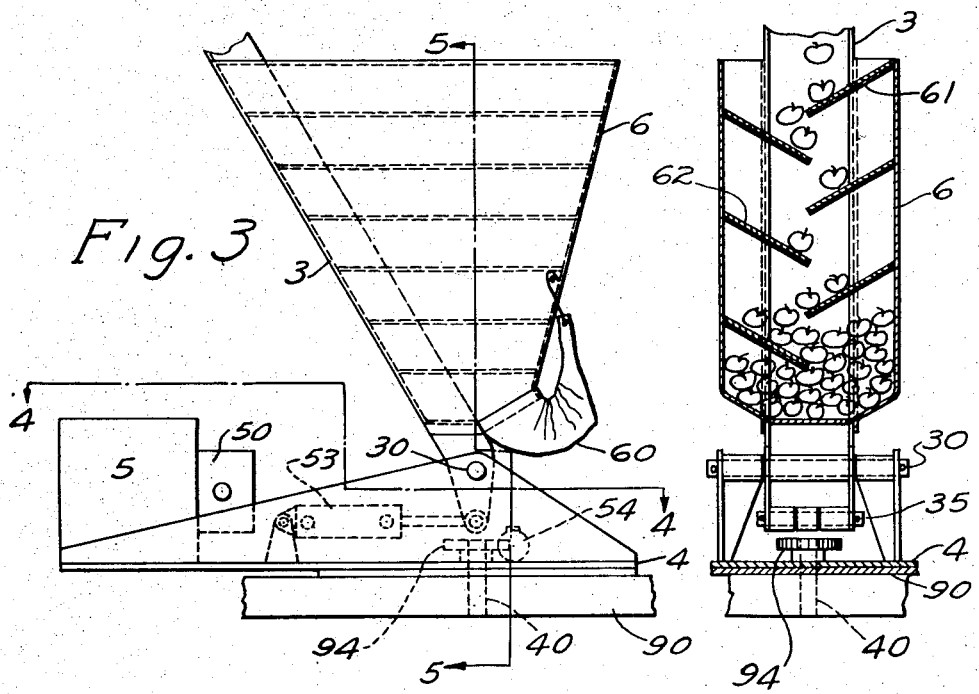

Sept. 28, 1948.  H. B. MILLER  2,450,152
FRUIT PICKER'S CRANE
Filed Jan. 5, 1946  3 Sheets-Sheet 3
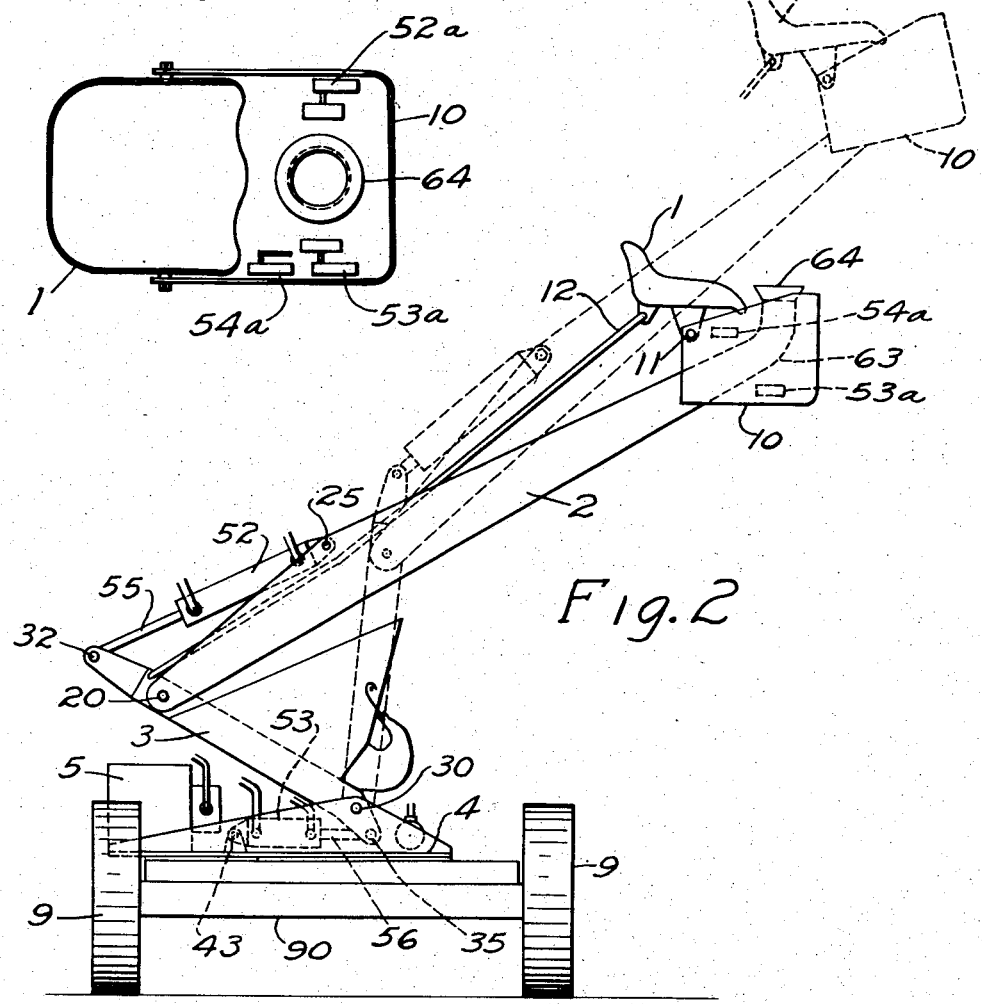
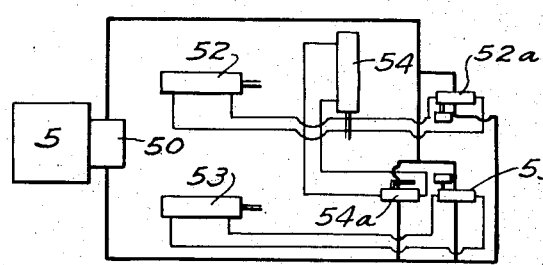
INVENTOR.
HOWARD B. MILLER.
BY
Reynolds + Beach
ATTORNEYS Patented Sept. 28, 1948

2,450,152

UNITED STATES PATENT OFFICE 2,450,152

FRUIT PICKER'S CRANE

Howard B. Miller, Seattle, Wash.

Application January 5, 1946, Serial No. 639,254

9 Claims. (Cl. 214—83.1)

The present invention relates to the servicing of trees or the like. While it is primarily designed to afford a perch for the picker of fruit from the trees, it is likewise useful for such other services as pruning, spraying, inspection, thinning, and the like.

Orchard fruits, such as apples, pears, peaches, and the like, are hand picked, for they are easily bruised. Each picker climbs a ladder, the standard ladder being 14 feet in height, and from this position picks and deposits into a canvas sack, supported around his neck or shoulders, as much of the fruit as he can reach or his sack will support. When his picking sack is filled, or when he can no longer advantageously reach fruit to be picked, he descends the ladder, empties his sack carefully lest the fruit be bruised, moves the ladder to a new location, climbs it, and recommences picking. It is evident that the picker's efforts are limited to the fruit which is within ready reach of a given location of his ladder, and that a considerable amount of precious time— precious because the fruit is ripe and may spoil, as well as because the picker is well paid—is wasted in descending and ascending the ladder, and in shifting it from one location to another, and in the careful handling of the fruit, first into the picker's sack, and then from the sack into field boxes or the like.

Moreover, there is a tendency to damage the tree and a part of the crop by contact with it, or by leaning ladders or pickers' bodies against it. The height of the trees, and hence a limitation on their ability to grow and bear fruit, is set by the height of the ladders.

Turning for a moment to the various other servicing operations, mentioned above, these become tedious and time-consuming, and the results fall short of those desired, by reason of the fact that ladders must be shifted from place to place to accomplish such operations thoroughly, or to avoid such shifting of ladders, the job is done less thoroughly or efficiently from the ground.

It is a prime object of the present invention to provide a device by means of which a picker or individual intent on other such operations may, from an elevated perch, movable from tree to tree, move himself in three directions with respect to each tree, yet without appreciable contact with the tree, to the end that any of these various operations may be performed with dispatch and efficiently, and particularly without the necessity of descending for the purpose of shifting from point to point, at least along one side of the tree.

More specifically, it is an object to provide a device incorporating a picker's perch mounted upon a mobile platform which can be moved from tree to tree, and which, in position relative to any one tree, can normally enable a picker to cover adequately the entire adjacent side of the tree from top to bottom, in and out, and from side to side, and to pick the fruit, or perform any other operation, and in the event he is picking fruit to convey the fruit from the picker's perch to a receiving bin below, whence it is accessible from the ground.

Moreover, since the extreme height to which a picker may be moved by such apparatus can readily be in excess of the height of standard ladders, it becomes possible to grow taller, larger trees, thereby increasing the crop yield per tree.

It is also an object to provide a device of the nature indicated, which is of simple, convenient, and relatively inexpensive construction, and which is capable of operation in a convenient manner by operators not particularly mechanically skilled, and, in particular, to permit operation of the device, in all essential respects, from the picker's perch, in whatever position it may be adjusted.

Finally, it is an object to provide mechanism which will to so great a degree improve the ease and efficiency of picking and the like, that the job can be done better, quicker, and with less help.

With the above and similar objects in mind, as will appear as this specification progresses, the invention comprises the novel parts and the novel combination and arrangement thereof, as shown in the accompanying drawings, and as will be described in this specification, and defined in the claims which terminate the same.

In the accompanying drawings the invention is shown more or less diagrammatically and in its essentials only, in a representative form.

Figure 1 is a general elevation of the device, shown in operation relative to an apple tree, and Figure 2 is a similar view drawn to illustrate more particularly the mechanical features and the capabilities of the device.

Figure 3 is an elevation of the lower part of the machine, particularly the operating mechanism and the fruit-receiving bin, and Figure 4 is a plan view of the operating mechanism, the view point being indicated substantially by the line 4—4 of Figure 3, while Figure 5 is in general a section along the vertical plane indicated by the line 5—5 of Figure 3.

Figure 6 is a plan view of the fruit picker's perch.

Figure 7 is a diagram of the hydraulic controls and operating mechanism.

Figure 8 is a detail elevation of the fruit chute leading downwardly from the fruit picker's perch.

Since the device must be usable with each successive tree in a row in an orchard, the entire device is mobile, as indicated diagrammatically and generally by the chassis or platform 90 supported by the wheels 9. Supported from and above this mobile platform 90 is a fruit picker's perch, as represented by the seat 1 and the foot rest or enclosure 10. Between the platform and the perch extends supporting means, so arranged as to afford to the perch movement relative to the ground in three directions, preferably, that is to say, transversely of the platform, or in and out with respect to the tree; elevationally; and more or less longitudinally with respect to the platform, or transversely across the face or adjacent side of the tree. The means to these ends are so arranged and coordinated that each may be independently controlled, and all may be operated in conjunction, to afford a considerable degree of universal movement to the perch 1, 10.

To afford the traversing movement, in the form shown in the drawings, a turntable 4 is mounted upon the platform 90 for rotation about a vertical axis 40 (see Figure 4). Tiltably mounted upon the turntable, upon a horizontal axis 30, is a short lower arm 3, which by its swinging effects primarily inward and outward movement of the perch, that is, movement transversely of the platform 90, when parts are disposed as shown in Figures 1 and 2. Tiltable by an axis 20 adjacent the outer or swinging end of the arm 3 is a longer upper arm 2. The axes 20 and 30 being parallel, the articulated pair of arms 2, 3 each swing in the same plane, and the swinging of the arm 2 accomplishes primarily elevational movement. It will be noted that the arm 3 extends to one side of the turntable axis 40, and the arm 2 extends back across the axis 40 and to the opposite side thereof, thus tending to balance parts, and to prevent overbalancing of the mobile crane as a whole.

The seat 1 is pivoted at 11 to the foot enclosure 10, the latter being fixed to the outer or upper end of the arm 2, and the seat 1 is held generally level in all positions by means of a link 12 connecting it to the arm 3 at a point spaced from the pivot 20.

The power mechanism for accomplishing the movement described may take any desired form. As a convenient means of accomplishing these movements hydraulic means have been shown. A motor 5, which might be, for example, a gasoline driven motor, drives a pump 50 to supply liquid under pressure to operating cylinders for accomplishing the respective movements. The cylinder 52 with its plunger 55 is connected between the point 25 upon the arm 2 and a point 32 upon the arm 3, and by extending or lengthening the strut 52, 55, the arm 2 is lowered or raised with respect to the arm 3. The cylinder 53 with its plunger 56 is connected between the point 35 of the arm 3 and the anchorage 43 upon the turntable 4. By extending or contracting the strut 53, 56 the arm 3 may be lowered or raised with respect to the platform 4, or, considering its swinging end, it may be swung away from or towards the turntable's axis 40. The cylinder 54 carried upon the turntable 4, and anchored thereto at 45, has its plunger 57 connected to or extended to form a rack bar 58. Rack bar 58 is mounted upon the turntable but movable with respect thereto, and is held by guide 46 in mesh with a pinion 94 fixed to the platform 90. By extension or retraction of the strut 54, 57, the turntable is caused to rotate in one direction or the other about axis 40, thus affording traversing movement to the perch 1.

The controls for such movements are preferably centered at the picker's perch, so that he may operate them conveniently while engaged in picking. The supply of fluid to the cylinder 52 is controlled by the pedal-operated valve 52a, the cylinder 53 is controlled by the pedal-operated valve 53a, and the fluid for the cylinder 54 is controlled by the hand-operated valve 54a. Purely by the use of his feet the picker in his perch may control his elevation and his movement inwardly and outwardly, with respect to the tree, and whenever it becomes necessary he can effect traversing movement by manipulation of the valve 54a.

The device so far described, without more, would enable the performance of various servicing operations with a great deal more facility and efficiency than is possible by present methods. For instance, the tree can be sprayed, or thinned, or all parts inspected, with ease and rapidity, by the addition of means to receive and direct the fruit from the perch to a collecting station, the device has even greater advantages when used for picking. To this end a fruit receiving bin 6 of some appreciable capacity is mounted somewhat elevated above the platform 90, and preferably upon the lower arm 3. It is provided with a discharge spout 60, by means of which it may be closed, or which can be lowered to discharge collected fruit within the bin into field boxes, such as is indicated at B in Figure 1. The bin is preferably internally baffled, as is indicated at 61, so that the fruit will be eased down to its bottom without acquiring any appreciable momentum, and without bumping any hard surfaces. Indeed, the fruit-contacting surfaces of the baffles may be cushioned, as is indicated at 62. Leading to this bin is a fruit chute which may be separated from, but which preferably is formed as a part of, the upper arm 2. Indeed, structurally, the upper arm 2 may be essentially a fruit chute, and may be formed of sufficient strength to support the perch at its upper swinging end. This chute, as viewed in plan view in Figure 8, is similarly supplied with baffles 61, and these baffles, as well as the sides of the chute, may be cushioned on their fruit-contacting faces, as is indicated at 62. The upper end of the chute is constituted by a horn 63, and an entrance funnel 64 is conveniently located, so that the fruit picker may drop the fruit into the funnel without bruising or injuring it, to roll thence, whatever the inclination of the arm 2, to its lower end, and thence to be deposited within the bin 6, and to roll gently to the lowermost portion of the bin.

It will be noted that the prime mover 5 and pump 50 are located upon the turntable, opposite the side from which the perch 1, 10 projects. This, and the inclination of the short leg 3 to one side, and the crossing of the axis of the turntable by the arm 2 to the opposite side, tends to maintain balance of the crane as a whole, so that it may be pulled or moved on its wheels 9 into position with respect to each tree. The picking will proceed on that side, and then the crane can be moved to the next tree in the row. However, for further broadening its ground support, and thereby lessening the possibility of overbalancing, it may be provided with an additional wheel, as is indicated at 99 in Figure 1, which may be mounted upon an extension or extensible axis 98, so that it may be extended to a position beneath or outwardly of the perch 1, whenever needed, and may be withdrawn within the normal confines of the ground wheels 9 when not needed for such a purpose. The ground wheels 9 might themselves be thus extensibly mounted.

When used for picking, the picker will stay in his perch, moving it about from place to place with respect to his side of the tree, as conditions make necessary. The fruit which he picks, finding its way to the bin 6, is emptied from time to time into the field boxes B by a ground attendant, who may service several such pickers. Whenever one tree is thus picked, the crane is moved to the next tree in the row, and the picking proceeds.

It will be observed that the combined length of the arms 2, 3 may be very appreciable, to the end that the perch may be extended upwardly to a practicable level which is materially above the level that can be reached by a 14 foot picker's ladder. It is the length of these ladders which limits the height and general size and conformation of a fruit tree. Since by this mechanism it is possible to reach conveniently to greater heights, orchard trees may be permitted to grow taller and larger in all dimensions, and this should have the effect of increasing the crop yield per tree and per acre. Two pickers can pick a tree without a change of location, and the fruit they pick, and perhaps that of other pickers, can be disposed of by a single ground attendant. Thus a small crew can do much more work than a larger crew under present conditions, and do it better, with less fatigue, and at lower cost.

I claim as my invention:

1. A fruit picker's crane, comprising a mobile platform, a picker's perch, and means supporting said perch from and elevated above said platform for adjustment vertically, to and fro in traverse, and projectably away from and towards said platform, for ready access to a tree.

2. A fruit picker's crane, comprising a mobile platform, a picker's perch, means supporting said perch from and elevated above said platform for adjustment vertically, to and fro in traverse, and projectably away from and towards said platform, for ready access to a tree, and means disposed conveniently to an occupant of said perch for controlling its movement in any or all such directions.

3. A fruit picker's crane, comprising a mobile platform, a picker's perch, a turntable mounted upon said platform, means supporting said perch upon said turntable and elevated at a level thereabove, for adjustment vertically and horizontally at right angles to and in addition to the traversing movement permitted by said turntable, and means to govern each such movement.

4. A fruit picker's crane, comprising a mobile platform, a picker's perch, a pair of articulated arms supporting said perch from said platform, means for varying the tilting of each arm, relative to its immediate support, to alter the elevation and lateral extension of said perch, and further means intermediate the platform and the lowermost arm to shift the perch horizontally, in any elevated or laterally extended position, relative to said platform.

5. The combination of claim 4, characterized in that the control means for all three types of movement are located conveniently to an occupant of and for movement with said perch.

6. A fruit picker's crane, comprising a mobile platform, a picker's perch, a turntable mounted upon said platform, a short arm tiltably mounted upon said turntable to swing inwardly towards or outwardly from the turntable's axis, a longer arm tiltably mounted upon the swinging end of said short arm, and extending past the turntable's axis, for swinging in the same plane as the shorter arm upwardly or downwardly, said perch being mounted upon the outer end of said longer arm, and independent controls for each such movement.

7. A fruit picker's crane, comprising a mobile platform, a turntable rotatably mounted thereon, a picker's perch, a lower arm tiltably mounted by its lower end upon said turntable for movement transversely of the turntable's axis, an upper arm tiltably mounted by its lower end upon the upper end of said lower arm for swinging in the same plane as the lower arm, the picker's perch being mounted upon the upper end of said upper arm, a fruit-receiving bin carried by said lower arm, and a fruit chute carried by said upper arm to receive fruit at the picker's perch and to deliver it to said bin.

8. The combination of claim 7, wherein the fruit chute constitutes said upper arm.

9. The combination of claim 7, characterized in that the fruit chute is baffled from top to bottom to minimize bruising of the fruit in its descent.

HOWARD B. MILLER.

REFERENCES CITED

The following references are of record in the file of this patent:

UNITED STATES PATENTS

| Number | Name | Date |
| --- | --- | --- |
| 509,007 | Wadsworth | Nov. 21, 1893 |
| 1,133,436 | Gramling | Mar. 30, 1915 |
| 1,718,979 | Protzeller | July 2, 1929 |
| 2,261,483 | Nickles | Nov. 4, 1941 |
| 2,386,881 | Phillips | Oct. 16, 1945 |
| 2,410,030 | Horni | Oct. 29, 1946 |
| 2,428,184 | Swindler | Sept. 30, 1947 |

FOREIGN PATENTS

| Number | Country | Date |
| --- | --- | --- |
| 515,428 | Great Britain | Dec. 5, 1939 |